(12) United States Patent
Shepherd et al.

(10) Patent No.: US 10,476,059 B1
(45) Date of Patent: Nov. 12, 2019

(54) BATTERY PACK RETENTION ASSEMBLY AND METHOD

(71) Applicant: Ford Global Technologies, LLC, Dearborn, MI (US)

(72) Inventors: Barry Shepherd, Southfield, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/972,435

(22) Filed: May 7, 2018

(51) Int. Cl.
*H01M 2/10* (2006.01)
*B60K 1/04* (2019.01)

(52) U.S. Cl.
CPC ............ *H01M 2/1083* (2013.01); *B60K 1/04* (2013.01); *H01M 2/1077* (2013.01); *H01M 2220/20* (2013.01)

(58) Field of Classification Search
CPC ............ H01M 2/1083; H01M 2/1077; H01M 2220/20; B60L 3/0007; B60K 1/04
USPC ........................................................ 180/68.5
See application file for complete search history.

(56) References Cited

U.S. PATENT DOCUMENTS

| | | | |
|---|---|---|---|
| 5,585,205 A | 12/1996 | Kohchi | |
| 8,276,698 B2 * | 10/2012 | Guss | B60K 1/04 180/68.5 |
| 8,776,926 B2 | 7/2014 | Auer et al. | |
| 8,795,876 B2 | 8/2014 | Thomas et al. | |
| 9,139,074 B2 | 9/2015 | Jarocki | |
| 9,156,340 B2 | 10/2015 | van den Akker | |
| 9,227,601 B2 | 1/2016 | Corlitsen | |
| 9,539,889 B2 * | 1/2017 | Lim | B60K 1/04 |
| 9,722,223 B1 | 8/2017 | Maguire | |
| 9,776,588 B2 * | 10/2017 | Wolkenstein | B60L 3/0007 |
| 2009/0166116 A1 | 7/2009 | Kiya et al. | |
| 2013/0104361 A1 | 5/2013 | Cortitsen | |
| 2014/0196966 A1 | 7/2014 | Ohgitani et al. | |
| 2018/0141424 A1 * | 5/2018 | Goettfried | B62D 21/157 |

* cited by examiner

Primary Examiner — John D Walters
(74) Attorney, Agent, or Firm — Carlson, Gaskey & Olds, P.C.

(57) ABSTRACT

An example battery pack retention system includes, among other things, a retention assembly that transitions from a disengaged to an engaged position in response to movement of a portion of a battery pack enclosure relative to a battery array housed within the battery pack enclosure. An example securing method includes, among other things, moving a portion of a battery pack enclosure relative to a battery array that is housed within the battery pack enclosure to transition a retention assembly from a disengaged to an engaged position.

18 Claims, 8 Drawing Sheets

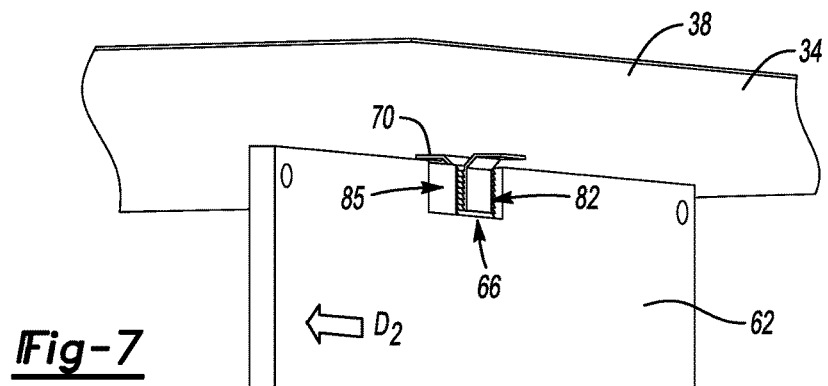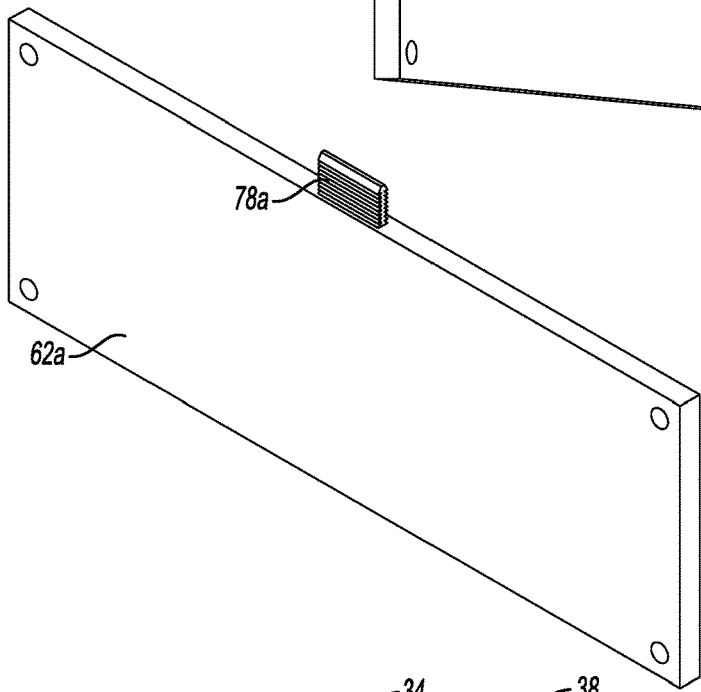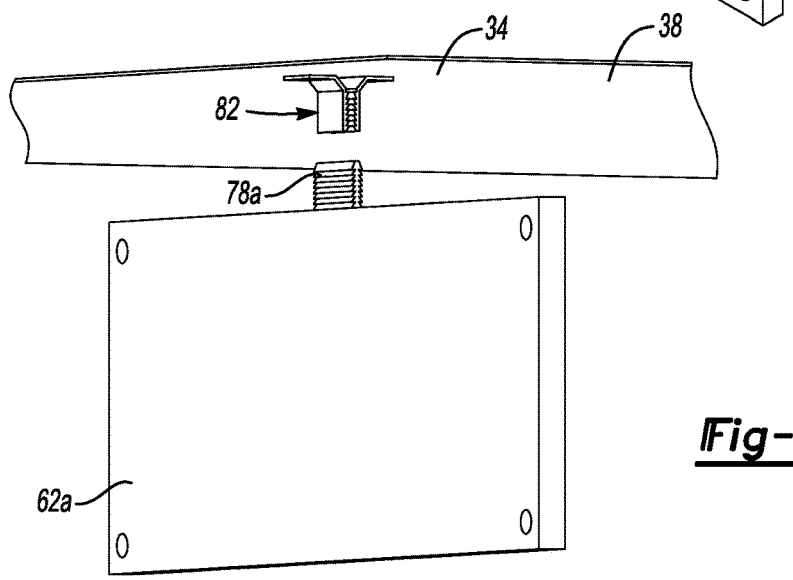

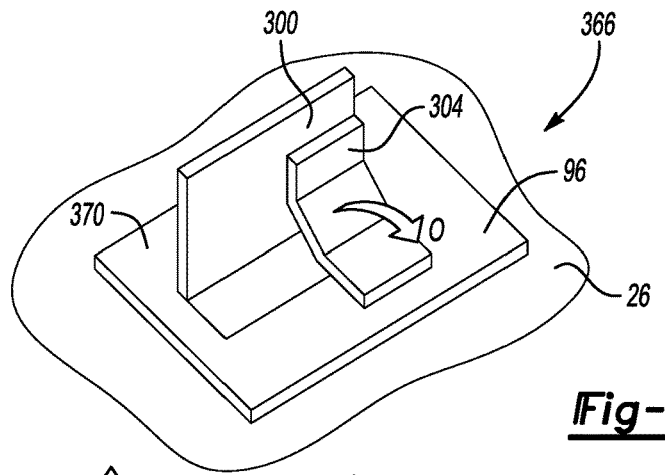
*Fig-16*
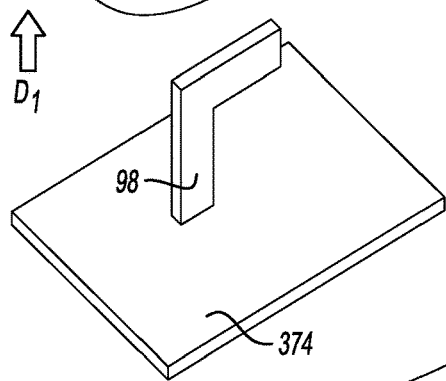
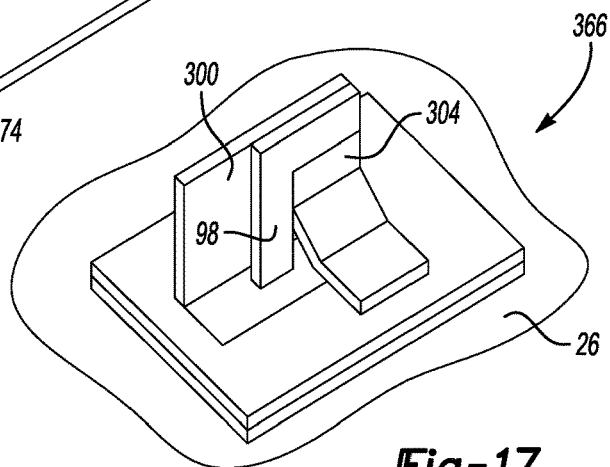
*Fig-17*
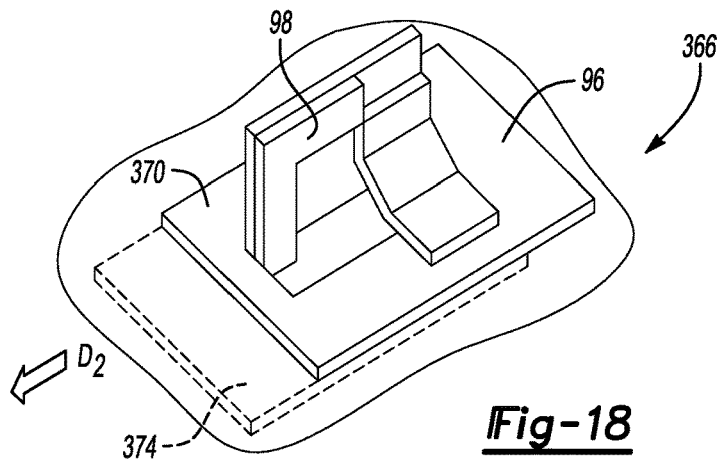
*Fig-18*

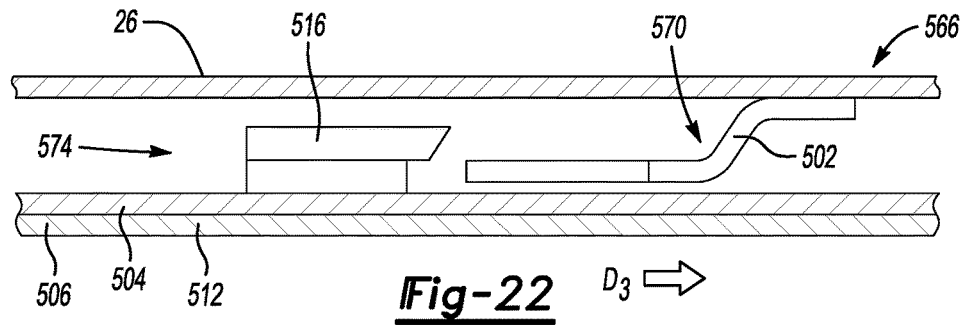
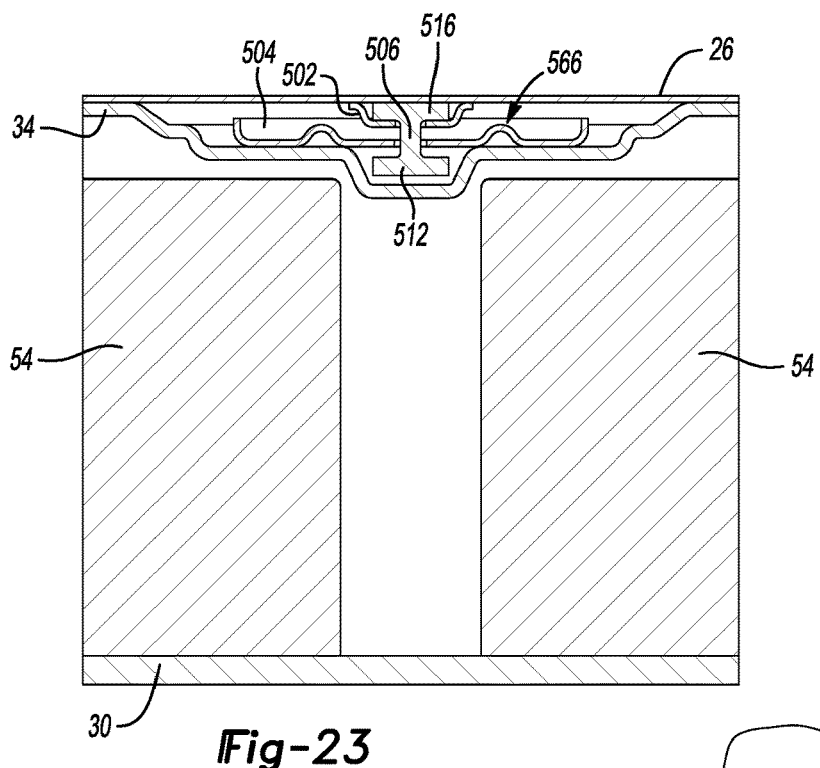
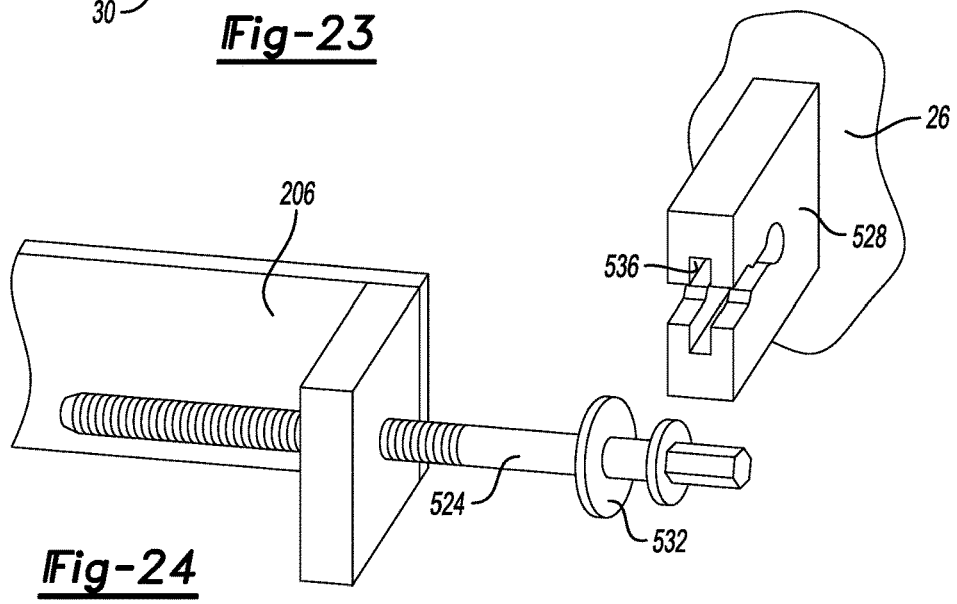

BATTERY PACK RETENTION ASSEMBLY AND METHOD

TECHNICAL FIELD

This disclosure relates generally to securing a battery pack and, more particularly, to a retention assembly and securing method.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electrified vehicles (HEVs), plug-in hybrid electrified vehicles (PHEVs), fuel cell vehicles (FCVs), and battery electrified vehicles (BEVs).

The traction batteries of electrified vehicles can include a battery pack having several individual battery arrays within an interior of a battery pack enclosure. Some vehicles secure the battery pack to an underbody of the electrified vehicle. Packaging space beneath the underbody is limited, especially vertical packaging space. Securing the battery pack in places other than about its lateral sides can be difficult due to tool clearance issues.

Some manufacturers attach a battery pack to the underbody using fasteners extending from a vertical bottom of the battery pack enclosure across the open area to the underbody. To seal the fasteners from the open area, the fasteners are positioned within a conduit. Such attachment strategies can be complex.

SUMMARY

A battery pack retention system according to an exemplary aspect of the present disclosure includes, among other things, a retention assembly that transitions from a disengaged to an engaged position in response to movement of a portion of a battery pack enclosure relative to a battery array housed within the battery pack enclosure.

In another example of the foregoing assembly, the retention assembly in the engaged position holds the battery pack enclosure and the battery array relative to each other.

Another example of any of the foregoing assemblies includes a plurality of laterally facing sidewalls of the battery pack enclosure. The retention assembly in the engaged position is disposed entirely within an interior of the battery pack enclosure and spaced a distance from the laterally facing sidewalls.

Another example of any of the foregoing assemblies includes a first portion of the retention assembly disposed on the battery pack enclosure and a second portion of the retention assembly disposed on the battery array.

In another example of any of the foregoing assemblies, the second portion is disposed on an endplate of the battery array.

In another example of any of the foregoing assemblies, the retention assembly is configured to transition from the disengaged to the engaged position in response to relative movement of the first portion toward the second portion in a first direction, and the retention assembly is configured to transition from the engaged to the disengaged position in response to movement of the first portion relative to the second portion in a second direction that is transverse to the first direction.

Another example of any of the foregoing assemblies includes a first portion of the retention assembly disposed on a lid of the battery pack enclosure and a second portion of the retention assembly disposed on a tray of the battery pack.

In another example of any of the foregoing assemblies, the first and second portions extend between the battery array and an adjacent battery array within the battery pack enclosure.

Another example of any of the foregoing assemblies includes a serrated tab of the retention assembly and a serrated clip of the retention assembly. The serrated tab is received within the serrated clip when the retention assembly is in the engaged position.

Another example of any of the foregoing assemblies includes a slotted bracket of the retention assembly and a tanged clip of the retention assembly. The slotted bracket is configured to compress at least one tang of the tanged clip to permit insertion of the tanged clip into a slot of the slotted bracket as the retention assembly is transitioned from a disengaged to an engaged position.

Another example of any of the foregoing assemblies includes a clip of the retention assembly and a lip of the retention assembly. The clip is configured to receive the lip as the retention assembly is transitioned from a disengaged to an engaged position.

Another example of any of the foregoing assemblies includes a hooked extension of the retention assembly and a tabbed bracket of the retention assembly. The tabbed bracket includes a tab biased toward a flange. The hooked extension is configured to bend the tab to permit movement of a portion of the hooked extension between the tab and the flange as the retention assembly is transitioned from the disengaged to the engaged position.

In another example of any of the foregoing assemblies, the at least one tab contacts the extension to blocks movement of the retention assembly from the engaged to the disengaged position.

A securing method according to another exemplary non-limiting aspect of the present disclosure includes, among other things, moving a portion of a battery pack enclosure relative to a battery array that is housed within the battery pack enclosure to transition a retention assembly from a disengaged to an engaged position.

Another example of the foregoing method includes powering an electrified vehicle using the battery array.

In another example of any of the foregoing methods, the retention assembly in the engaged position is disposed entirely within an interior of the battery pack enclosure and spaced a distance from each laterally facing side of the battery pack enclosure.

In another example of any of the foregoing methods, a first portion of the retention assembly is disposed on the battery pack enclosure and a second portion of the retention assembly is disposed on the battery array.

Another example of any of the foregoing methods includes transitioning the retention assembly from the disengaged to the engaged position by moving the first portion relatively toward the second portion in a first direction, and transitioning the retention assembly from the engaged to the disengaged position by moving the first portion relative to the second portion in a second direction that is transverse to the first direction.

In another example of any of the foregoing methods, the first direction extends vertically, and the second direction extends horizontally.

Another example of any of the foregoing methods includes securing a lid of the battery pack enclosure to a tray of the battery pack enclosure using the retention assembly in the engaged position.

BRIEF DESCRIPTION OF THE FIGURES

The various features and advantages of the disclosed examples will become apparent to those skilled in the art from the detailed description. The figures that accompany the detailed description can be briefly described as follows:

FIG. 7 illustrates the retention assembly of FIG. 6 in an engaged position.

FIG. 8 illustrates an endplate providing a portion of a retention assembly according to another exemplary embodiment of the present disclosure.

FIG. 9 illustrates the endplate of FIG. 8 and another portion of the retention assembly in a disengaged position.

FIG. 16 illustrates a retention assembly moveable to an engaged position where the retention assembly secures the battery pack of FIG. 1 to the underbody of the electrified vehicle according to another exemplary embodiment.

FIG. 17 illustrates the retention assembly of FIG. 16 in the engaged position.

FIG. 18 illustrates the retention assembly of FIGS. 16 and 17 transitioned laterally from the engaged position.

FIG. 22 illustrates a sectioned side view of selected portions of the retention assembly of FIG. 20.

FIG. 23 illustrates a sectioned side view of selected portions of the retention assembly of FIG. 20 when securing the battery pace to the underbody.

FIG. 24 illustrates a variation of a rail assembly portion of the retention assembly of FIGS. 20-23.

DETAILED DESCRIPTION

This disclosure relates to a retention assembly that secures portions of a battery pack. In some examples, the retention assembly can be contained within an interior of an enclosure of the battery pack and used to secure, for example, a lid of the enclosure to a tray or a battery array. In other examples, the retention assembly can be outside the interior of the enclosure and used to secure, for example, the lid of the enclosure to an underbody of an electrified vehicle.

Figure 1:
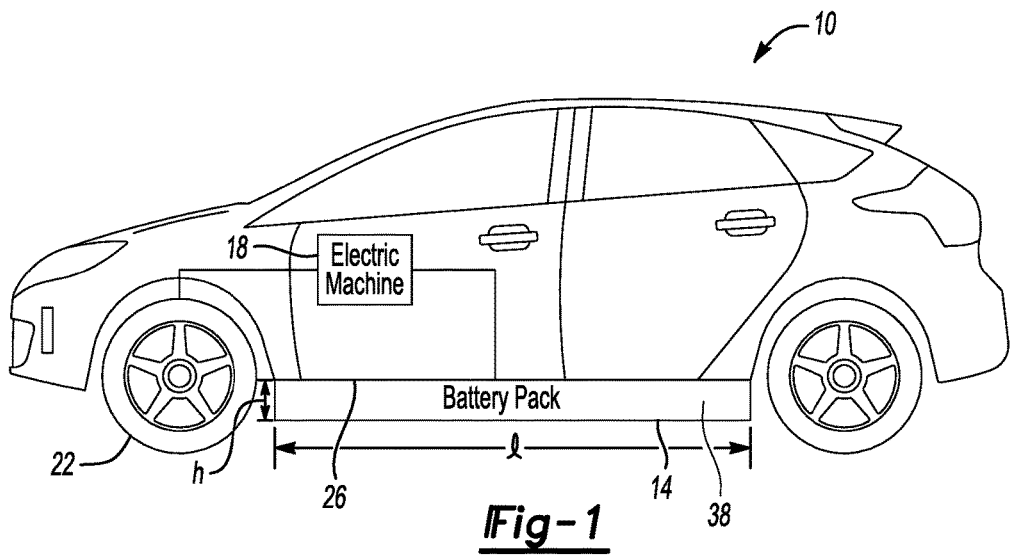
FIG. 1 illustrates a side view of an electrified vehicle according to an exemplary aspect of the present disclosure.

Referring to FIG. 1, an example electrified vehicle 10 includes a battery pack 14 that powers an electric machine 18. The electrified vehicle 10 includes wheels 22 driven by the electric machine 18. The electric machine 18 receives electric power from the battery pack 14 and converts the electric power to torque to drive the wheels 22. The example battery pack 14 is considered a relatively high-voltage (e.g., 60 $V_{DC}$, 30 $V_{AC}$) battery.

The example electrified vehicle 10 is an all-electric vehicle. In other examples, the electrified vehicle 10 is a hybrid electric vehicle, which selectively drives wheels using torque provided by an internal combustion engine instead of, or in addition to, the electric machine 18. Generally, the electrified vehicle 10 can include any type of vehicle having a traction battery.

The electrified vehicle 10 includes an underbody 26. The example battery pack 14 is secured to the underbody 26. The exemplary battery pack 14 has a length l that is greater than its cross-car width. In other examples, the length l can be less than, or equal to, the cross-car width. The example battery pack 14 approaches a cross-car width that spans the opposing body rails of the electrified vehicle 10. The exemplary battery pack 14 has a relatively low height h to maintain appropriate clearances. The battery pack 14 can be secured to the underbody 26 with, for example, mechanical fasteners about an outer perimeter of the battery pack 14.

Figure 2:
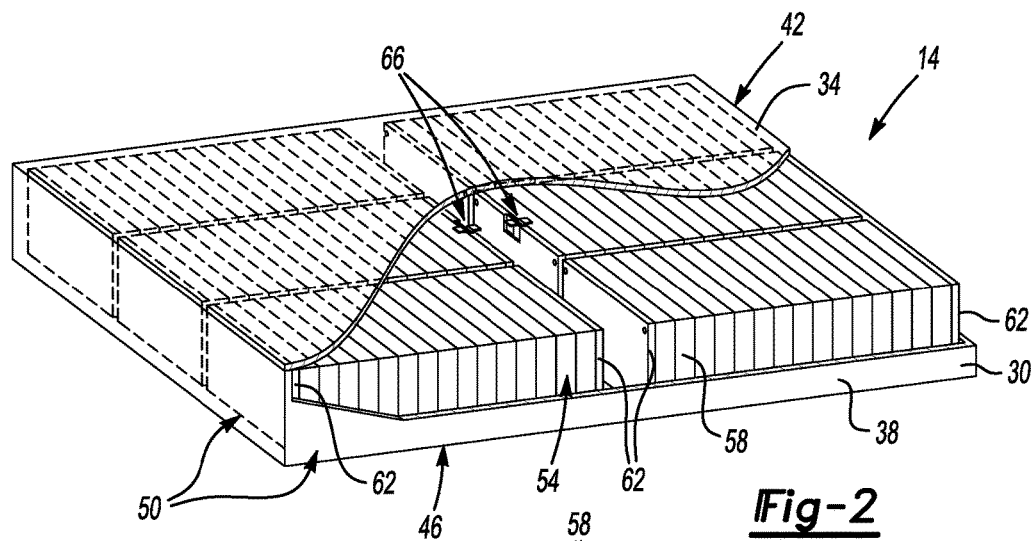
FIG. 2 illustrates a perspective view of a battery pack from the electrified vehicle of FIG. 1 according to an exemplary embodiment of the present disclosure with selected portions of an enclosure of the battery pack removed to show battery arrays within an interior of the enclosure.
Figure 3:
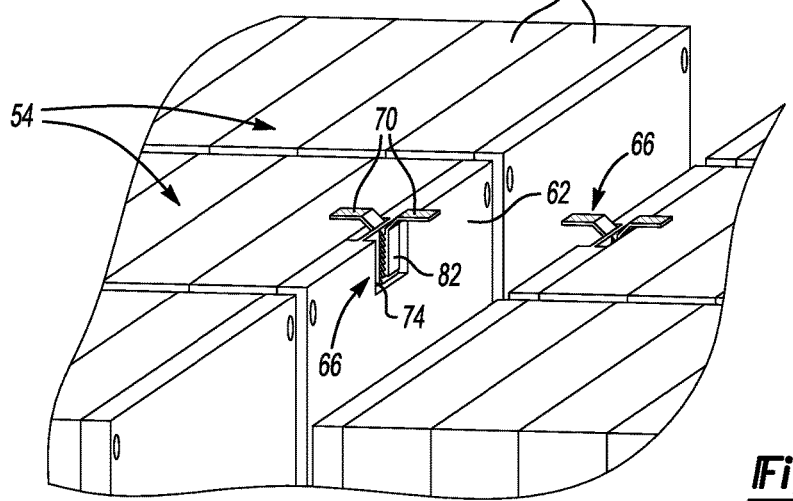
FIG. 3 illustrates a close-up view of selected portions of the battery pack of FIG. 2 with selected portions of the enclosure removed to show a retention assembly.
Figure 4:
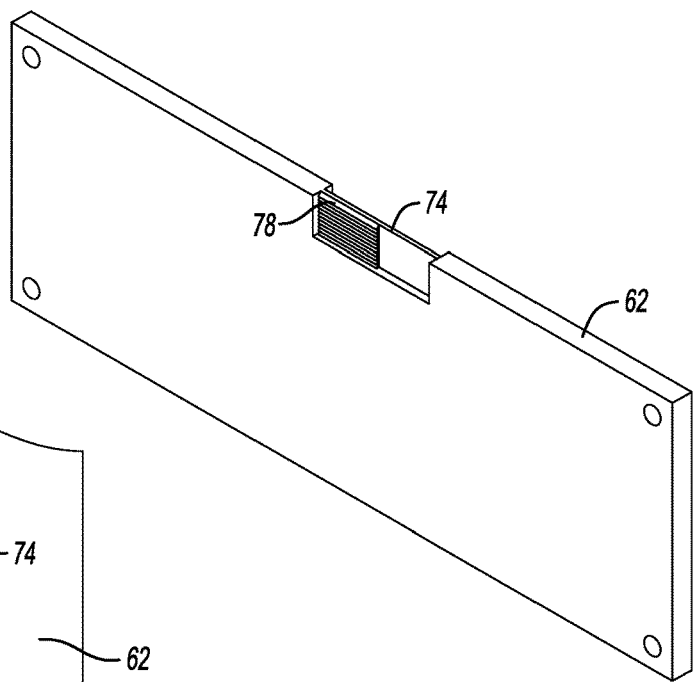
FIG. 4 illustrates a perspective view of an endplate from one of the battery arrays in the battery pack of FIGS. 2 and 3 that provides a portion of the retention assembly.
Figure 5:
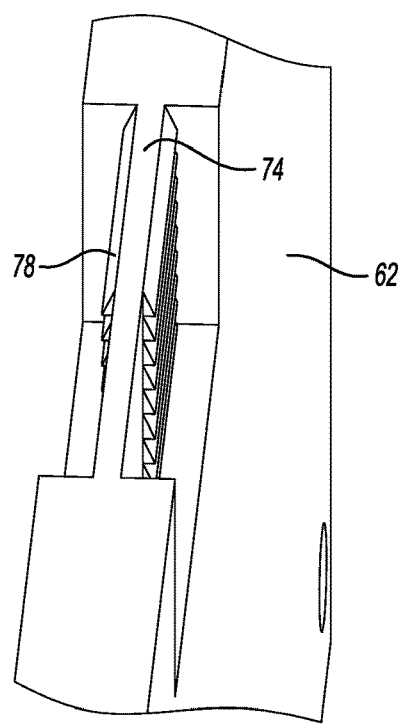
FIG. 5 illustrates a close-up view of the portion of the retention assembly provided by the endplate of FIG. 4.

Referring now to FIGS. 2 and 3 with continuing reference to FIG. 1, the exemplary battery pack 14 generally includes a tray 30 and a lid 34 that together provide an enclosure 38. The enclosure 38 has a top 42, a bottom 46, and a plurality of laterally facing sidewalls 50 extending therebetween.

The enclosure 38 provides an interior that holds, among other things, a plurality of battery arrays 54. In this example, the interior holds six battery arrays 54, although other numbers of battery arrays 54 could be used.

Each of the battery arrays 54 includes a plurality of individual battery cells 58 situated between a pair of opposing endplates 62. Within each of the battery arrays 54, the endplates 62 can compress together the individual battery cells 58. The battery cells 58 can store energy and can selectively provide power to the electric machine 18 of the electrified vehicle 10.

The battery pack 14 includes at least one retention assembly 66 that can transition between a disengaged position and an engaged position. In the engaged position, the retention assembly 66 holds a portion of the battery pack enclosure 38, here the lid 34, relative to one or more of the battery arrays 54. The retention assembly 66 can help to limit portions of the battery pack 14 from sagging vertically downward away from the underbody 26 when the battery pack 14 is secured to the electrified vehicle 10.

The exemplary retention assemblies 66 are disposed entirely within the interior of the enclosure 38 and are spaced a distance from the laterally facing sidewalls 50 of the enclosure 38. In this example, the retention assemblies 66 are disposed in a central region of the enclosure 38. The central region can be difficult to support utilizing mechanical fasteners that are secured using tools. This is due to, among other things, restricted tool access. Since the retention assemblies 66 are contained within the enclosure 38, sealing the retention assemblies 66 relative to the environment outside the interior is not required.

The retention assembly 66, in contrast to mechanical fasteners secured using tools, can transition from a disengaged position to the engaged position in response to movement of a portion of the enclosure 38 relative to the battery arrays 54 housed within the interior of the enclosure 38.

With reference now to FIGS. 4-7, and continuing reference to FIGS. 2 and 3, the exemplary retention assemblies 66 each include a first portion 70 disposed on the enclosure 38, here the lid 34, and a second portion 74 disposed on at least one of the battery arrays 54.

In this exemplary embodiment, the second portion 74 is provided by one of the endplates 62 of the battery arrays 54. The second portion 74, in another embodiment, could be provided by a portion of the enclosure 38 other than the lid 34, such as a flange extending upwardly from the tray 30 between the battery arrays 54. The second portion 74 could instead be provided by a side wall (not shown) of the battery arrays 54 that extends axially along the sides of the battery arrays 54 from one endplate 62 to the opposing endplate. The second portion 74 could instead be provide by some other structure within the enclosure 34.

The second portion 74 comprises a serrated tab 78 of the endplate 62. The first portion 70 comprises a serrated bracket 82, extending downwardly from the lid 34 of the enclosure 38. The first portion 70 and the second portion 74 could be reversed such that the first portion 70 extends from the endplate 62, and the second portion 74 extends from the lid 34 or another area of the enclosure 38.

Figure 6:
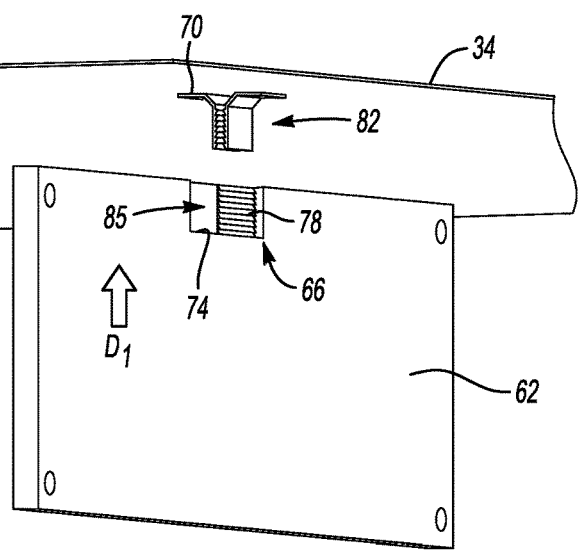
FIG. 6 illustrates the endplate of FIG. 4 and another portion of the retention assembly in a disengaged position.

FIG. 6 illustrates the retention assembly 66 in a disengaged position. To move the retention assembly 66 to from the disengaged position to the engaged position shown in FIG. 7, the first portion 70 is moved relative to the second portion 74 in a first direction $D_1$, which is vertically upwards in this example. The movement of the first portion 70 relative to the second portion 74 causes the serrated tabs 78 to be received within the serrated bracket 82. Interfacing serrations of the serrated tab 78, the serrated bracket 82, or both, then hold the position of the serrated tab 78 relative to the serrated bracket 82. This blocks the serrated tab 78 from withdrawing vertically away from the serrated bracket 82. In the engaged position, the retention assembly 66 thus blocks vertical movement of the endplate 62, and thus the associated battery array 54, relative to the lid 34.

To move the retention assembly 66 from the engaged position of FIG. 7 back to the disengaged position, the lid 34 can be moved relative to the endplate 62 in a direction $D_2$, which is transverse to the direction $D_1$. Mechanical fasteners at a lateral perimeter of the enclosure 38 could be used to block movement in the direction $D_2$ when not desired. This relative movement in the direction $D_2$ slides the serrated bracket 82 laterally into an area 85 of the endplate 62 such that the serrated tab 78 is no longer received within the serrated bracket 82. The lid 34 can then be moved vertically relatively away from the endplate 62 to permit access to the interior of the enclosure 38. Vertical and horizontal, for purposes of this disclosure are with reference to ground and a normal orientation of the electrified vehicle 10 during operation.

In the exemplary embodiment, the serrated tab 78 engages serrations of the serrated bracket 82 on both sides of the serrated tab 78. In other examples, the serrated tab 78 could include serrations only on one side—like a zip tie. The other side could include a hook. That is, the serrated tabs are not limited to tabs having serrations on both sides.

In the exemplary embodiment, the serrated bracket 82 includes a first portion that engages a first side of the serrated tab 78, and a second portion that engages an opposite, second side of the serrated tab 78. A gap between the first and second portions corresponds generally to a width of the serrated tab 78. Other types of serrated brackets 82 could include a wider gap. For example, the first portion of the bracket 82 could engage the serrated tab 78 of the endplate 62, and the second portion of the bracket 82 could engage the serrated tab 78 of the opposing endplate of the battery array 54. Other types of serrated brackets 82 could include no gap. For example, the second portion could be omitted and only the first portion of the bracket 82 used to engage one side of the serrated tab 78.

Figure 10:
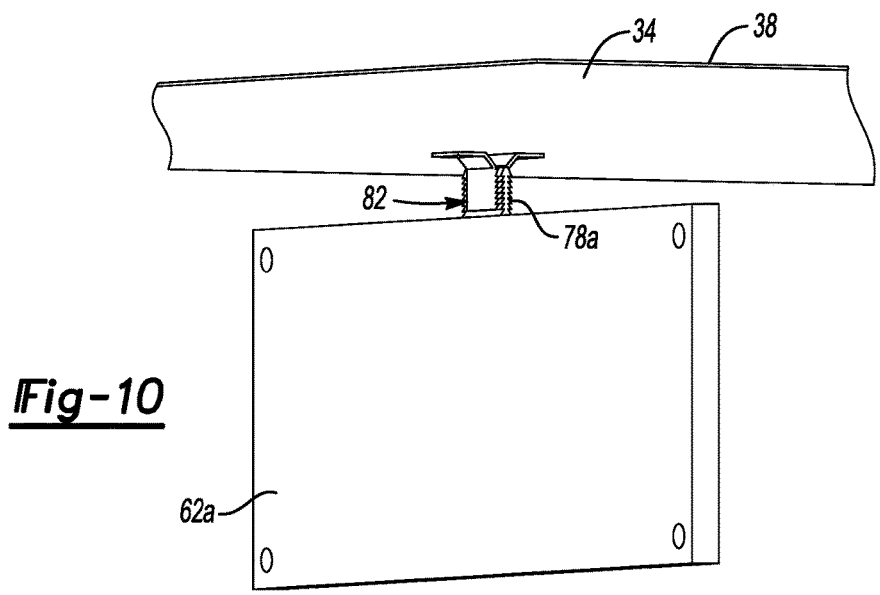
FIG. 10 illustrates the endplate of FIG. 8 and the other portion of the retention assembly in an engaged position.

With reference to FIGS. 8, 9, and 10, a variation of the retention assembly 66 includes a serrated tab 78a that extends upwardly beyond other portions of the endplate 62a. The serrated tab 78a can move from a disengaged position shown in FIG. 9 to the engaged position shown in FIG. 10 in a manner similar to the serrated tab 78 of the embodiment of FIGS. 3-7. To move the serrated tab 78A from the engaged position, the serrated tab 78A can be shifted laterally relative to the serrated bracket 82 so that the serrated tab 78a is no longer received within the serrated bracket 82.

Figure 11:
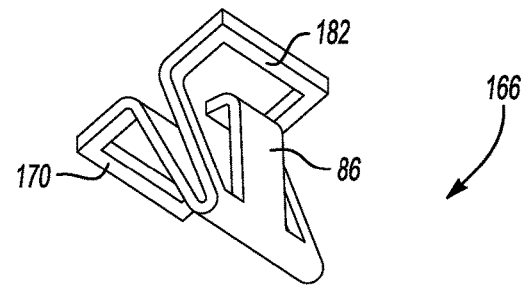
FIG. 11 illustrates a retention assembly according to yet another exemplary embodiment when the retention assembly is in a disengaged position.
Figure 12:
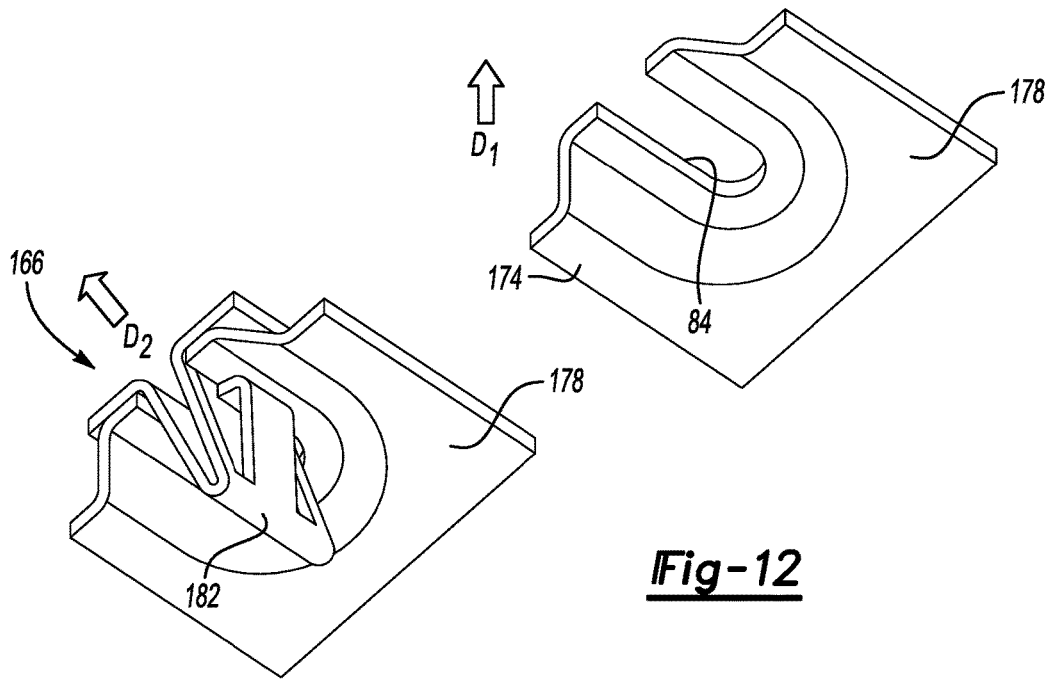
FIG. 12 illustrates the retention assembly of FIG. 11 in an engaged position.

With reference now to FIGS. 11 and 12, a retention assembly 166 according to another exemplary aspect of the present disclosure can include a first portion 170 provided by a tanged clip 182 and a second portion 174 provided by a slotted bracket 178. The slotted bracket 178 could be disposed on one of the battery arrays 54, such as a portion of one of the endplates 62 (FIG. 3), or on a portion of the enclosure 38. The tanged clip 182 could be disposed on the enclosure 38, such as on a portion of the lid 34 of the enclosure 38. The retention assembly 166, like the retention assemblies 66, is contained within an interior of the enclosure 38.

To move the retention assembly 166 from the disengaged position of FIG. 11 to the engaged position of FIG. 12, the second portion 174 is moved relatively toward the first portion 170 in the direction D1 such that the tanged clip 182 is positioned within a slot 84 of the slotted bracket 178. Opposing tangs 86 of the tanged clip 182 are compressed inwardly as the tanged clip 182 is inserted into the slot 84. After sufficient insertion, the tangs 86 spring back outwardly to block movement of the tanged clip 182 relative to the slotted bracket 178 in the direction $D_1$.

To transition the retention assembly 166 from the engaged position of FIG. 12, the tanged clip 182 can be moved in the direction $D_2$ relative to the slotted bracket 178, which moves the tanged clip 182 out of the slot 84. When outside the slot 84, the tangs 86 no longer hold the slotted bracket 178. The tanged clip 182 can then be moved relative to the slotted bracket 178 in the direction $D_1$. The direction $D_2$ is transverse to the direction $D_1$ and, in this example, perpendicular to the direction $D_1$.

Figure 13:
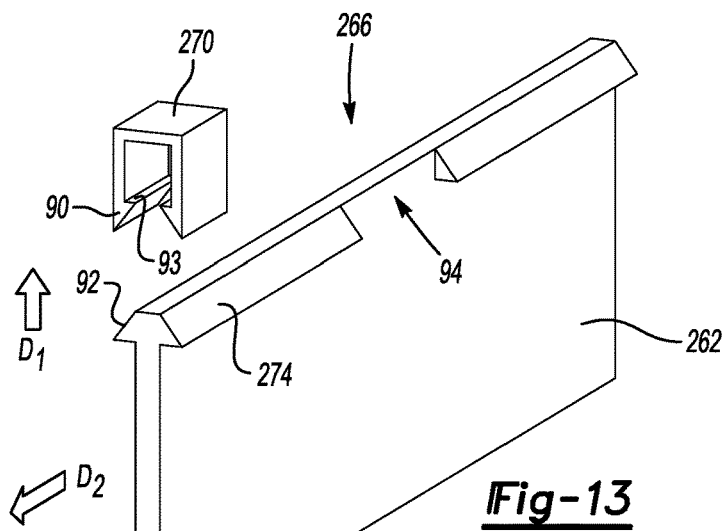
FIG. 13 illustrates a retention assembly for use in a battery pack according to still another exemplary embodiment when the retention assembly is a disengaged position.

With reference now to FIG. 13, another exemplary retention assembly 266 includes a first portion 270 provided by a clip 90 and a second portion 274 provided by a lip 92. In the exemplary embodiment, the clip 90 can extend from a portion of the enclosure 38, such as a portion of the lid 34. The lip 92 can be provided by a component one of the battery arrays 54 such as an endplate 262 of one of the battery arrays. The lip 92 could be a portion of the tray 30 (FIG. 1) extending upward toward the lid 34.

The retention assembly 266 can be moved to an engaged position by moving the second portion 274 relative to the first portion 270 in the direction $D_1$ until the lip 92 is held by the clip 90. Hooks 93 on the clip 90 grasp the lip 92 to prevent the lip 92, and thus the endplate 262, from withdrawing from the clip 90, which could move the retention assembly 266 from the engaged position.

To move the retention assembly 266 from the engaged position, the lip 92 can be moved in a direction $D_2$ relative to the clip 90 until the clip 90 moves into an open area 94. When the clip 90 is fully within the open area 94, the hooks 93 of the clip 90 no longer engages the lip 92. The clip 90 can be moved in the direction $D_1$ relative to the endplate 262.

Figure 14:
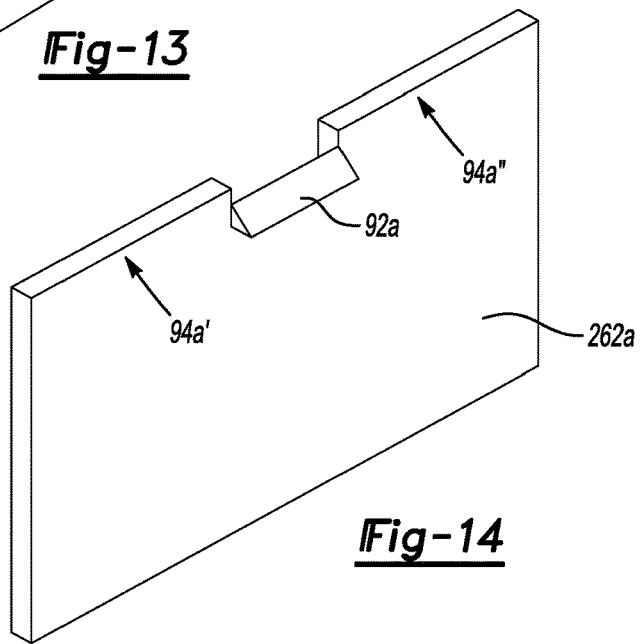
FIG. 14 illustrates a variation of an endplate from the retention assembly of FIG. 13.

FIG. 14 shows a variation of the endplate 262a where the lip 92a is at a median of the endplate 262a, and open areas 94a' and 94a" are provided on opposite sides of the lip 92A. A clip, such as the clip 90 shown in FIG. 13, can engage the lip 92a to transition the retention assembly 266 into an engaged position. The endplate 262a can then be moved in the direction $D_2$ or a direction opposite the direction $D_2$ to move the clip 90 into the open area 94a' or the open area 94a" such that the endplate 262a can be moved relatively away from the clip 90.

Figure 15:
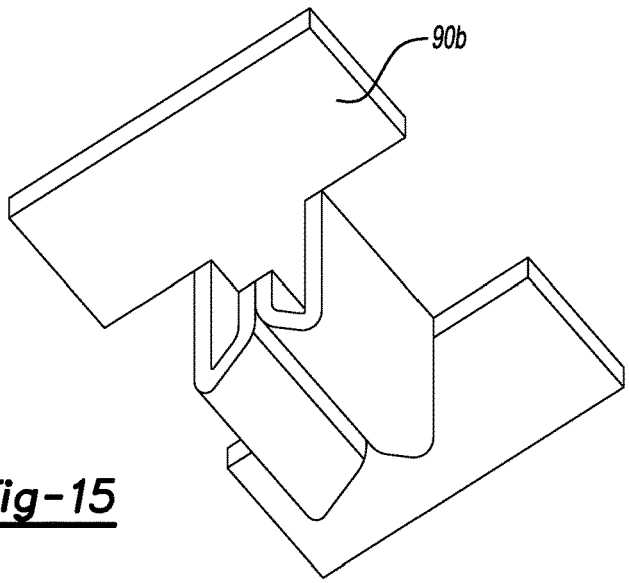
FIG. 15 illustrates a variation of a clip from the retention assembly of FIG. 13.

FIG. 15 shows a variation of the clip 90b, where the clip is formed by bent metallic tabs. The clip 90b could be, for example, spot welded to the lid 34 of the enclosure 38.

With reference now to FIGS. 16-18, another exemplary retention assembly 366 can be used to secure the enclosure 38 (FIG. 2) to the underbody 26 of the electrified vehicle 10. The retention assembly 366 can be outside an interior of the battery pack 14.

In the exemplary embodiment, the retention assembly 366 includes a first portion 370 provided by a tabbed bracket 96 and a second portion 374 provided by a hooked extension 98. Moving the retention assembly 366 from the disengaged position of FIG. 16 can include moving the first portion 370 in a direction $D_1$ relative to the second portion 374.

The tabbed bracket 96 includes a flange 300 and a tab 304. The tab 304 is biased toward the flange 300 as shown in FIG. 16. The hooked extension 98 can move between the flange 300 and the tab 304 of the tabbed bracket 96 as the first portion 370 is moved in the direction $D_1$ relative to the second portion 374. The tab 304 flexes outward in a direction O to permit this movement of the hooked extension 98.

When the hooked extension 98 has moved to the position of FIG. 17, the hooked extension 98 has moved past the tab 304. The tab 304 can then return to the position where the tab 304 is biased against the flange 300. In this position, the tab 304 blocks the hooked extension 98 from withdrawing in a direction opposite the direction $D_1$ away from the engaged position of FIG. 17.

To transition the retention assembly 366 from the engaged position of FIG. 17 to a disengaged position, the second portion 374 can be slid relative to the first portion 370 in a direction $D_2$, which is transverse to the direction $D_1$. This moves the hooked extension 98 away from the tab 304 as shown in FIG. 18 so that the second portion 374 can be withdrawn from the first portion 370 in a direction oppose the direction $D_1$. Mechanical fasteners at a perimeter of the enclosure 38 could prevent movement in the direction $D_2$ when not desired.

The tabbed bracket 96 could be formed within the underbody 26. The hooked extension 98 could extend vertically upward from the top 42 of the lid 34 of the enclosure 38 for example. In another example, the tabbed bracket 96 is on the enclosure 38 and the hooked extension 98 extends from the underbody 26.

Figure 19:
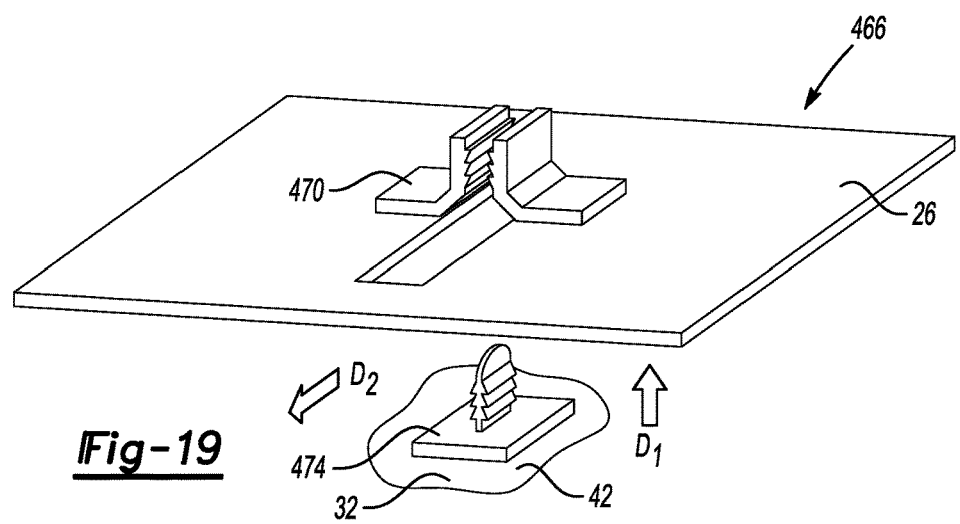
FIG. 19 illustrates a retention assembly moveable to an engaged position where the retention assembly secures the battery pack of FIG. 1 to the underbody of the electrified vehicle according to yet another exemplary embodiment.

Referring to FIG. 19 with reference to FIG. 1, another exemplary retention assembly 466 can be used to secure the enclosure 38 to the underbody 26 of the electrified vehicle 10. The retention assembly 466 can include a first portion 470 is provided by a serrated bracket disposed on the underbody 26 of the electrified vehicle 10, a second portion 474 is disposed on the top 42 of the lid 34 of the enclosure 38. Transitioning the retention assembly 466 to an engaged position can include moving the second portion 474 relative to the first portion 470 in a direction $D_1$ such that the serrated bracket receives the serrated tab.

To transition the retention assembly 466 from the engaged position, the serrated tab can be slid relative to the serrated bracket in a direction $D_2$, which is transverse to the direction $D_1$. This moves the serrated tab away from a position where the serrated tab is received within the serrated bracket. The serrated tab can then be moved away from the first portion 470 in a direction opposite the direction $D_1$.

Figure 20:
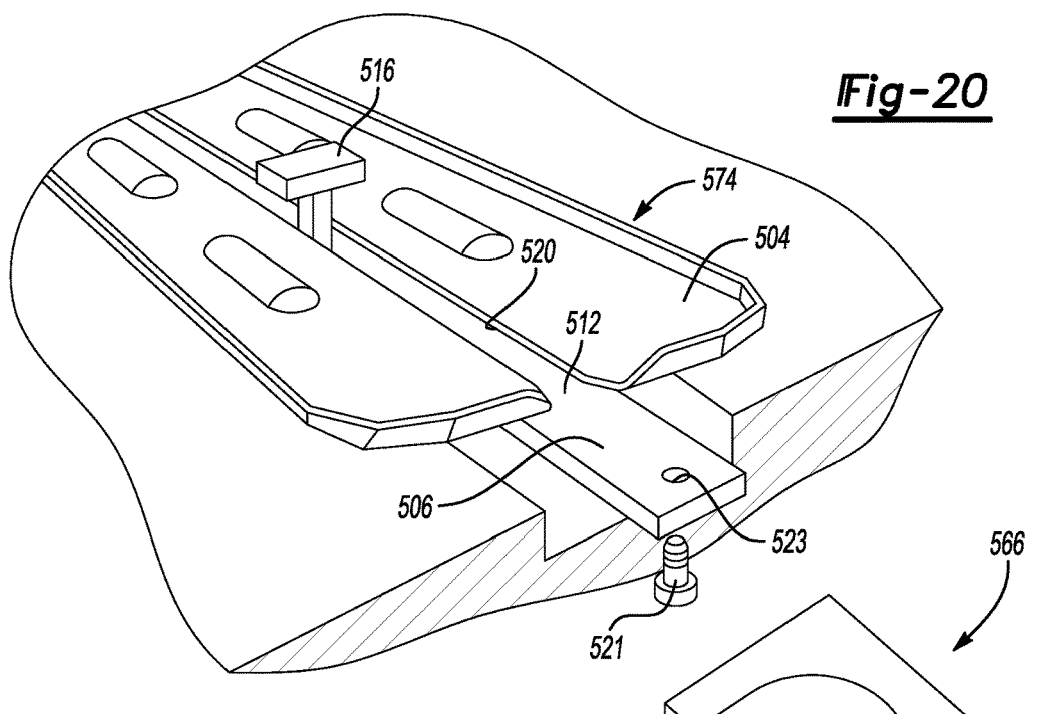
FIG. 20 illustrates selected portions of a retention assembly moveable to an engaged position where the retention assembly secures the battery pack of FIG. 1 to the underbody of the electrified vehicle according to yet another exemplary embodiment.
Figure 21:
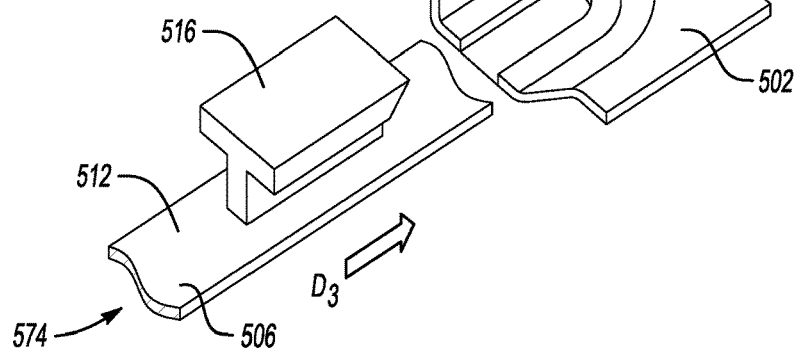
FIG. 21 illustrates a perspective view of selected portions of the retention assembly of FIG. 20.

Referring now to FIGS. 20-22 with reference to FIG. 1, a retention assembly 566 according to another exemplary non-limiting embodiment can be used to secure the enclosure 38 to the underbody 26 of the electrified vehicle 10. The retention assembly 566 includes a first portion 570 and a second portion 574. The first portion 570 is provided by at least on slotted bracket 502 on the underbody 26. The second portion 574 is provided by a retention bracket 504 of the enclosure 38, and a rail assembly 506. The retention bracket 504 can be secured to the top 42 of the lid 34 of the enclosure 38. The retention bracket 504 slideably receives the rail assembly 506. The retention bracket 504 holds a base 512 of the rail assembly 506 while permitting a protrusion 516 of the rail assembly 506 to extend upward through a slot 520 of the retention bracket 504.

To move the retention assembly 566 to an engaged position, the battery pack 14 can be moved upward toward the underbody 26. The rail assembly 506 is then slid relative to the battery pack 14 in a direction $D_3$ until the protrusion 516 of the rail assembly 506 is held within the slotted bracket 502 while the base 512 is held between the retention bracket 504 and the remaining portions of the enclosure 38. The slotted bracket 502 holds the protrusion 516 to limit movement of the battery pack 14 downward away from the underbody 26. A mechanical fastener 521 could extend through an aperture 523 in the rail assembly 506 and secured to the underbody 26 to block movement of the rail assembly 506 in a direction opposite the direction $D_3$. The mechanical fastener 521 can be secured from a position outside a lateral perimeter of the battery pack 14 to facilitate tool access.

Referring to FIG. 23, the retention assembly 566 can be positioned between battery arrays 54 within the enclosure 38. In particular, the retention assembly 566 can extend vertically between adjacent arrays 54 so that the retention assembly 566 does not significantly add vertical height to the battery pack 14. The retention assemblies 366, 466, of FIGS. 16-19 could be similarly positioned.

With reference to FIG. 24, and end of the rail assembly 206 could incorporate a threaded rod 524 received within an anchor bracket 528 of the underbody 26. The threaded rod 524 could be turned to translate the rail assembly 206 in the direction $D_3$. The rod 524 can include a rod flange 532 that engages with the anchor bracket 528 bracket to prevent the rod 524 from translating along its central axis when turned. The rod flange 532 is received within a pocket 536 of the anchor bracket 528.

The anchor bracket 528 can be disposed on a side rail or some other rigid member of the underbody 26. The end of the rod 524 can be a basic hexagonal extrusion with a backing flange to allow the rod 524 to be turned using a standard socket. A specified torque can be applied to the treaded rod to ensure that the rail assembly 206 has properly engaged the slotted brackets 502 (see FIGS. 21 and 22).

In this disclosure, like reference numerals designate like elements where appropriate, and reference numerals with the addition of one-hundred or multiples thereof generally designate modified elements. The modified elements substantially incorporate the same features and benefits of the corresponding modified elements, expect where stated otherwise.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack retention system, comprising:
a retention assembly that transitions from a disengaged to an engaged position in response to movement of a portion of a battery pack enclosure relative to a battery array housed within the battery pack enclosure, wherein a first portion of the retention assembly is disposed on the battery pack enclosure, and a second portion of the retention assembly is disposed on the battery array.

2. The battery pack retention system of claim 1, wherein the retention assembly in the engaged position holds the battery pack enclosure and the battery array relative to each other.

3. The battery pack retention system of claim 1, further comprising a plurality of laterally facing sidewalls of the battery pack enclosure, wherein the retention assembly in the engaged position is disposed entirely within an interior of the battery pack enclosure and spaced a distance from the laterally facing sidewalls.

4. The battery pack retention system of claim 1, wherein the second portion is disposed on an endplate of the battery array.

5. The battery pack retention system of claim 1, wherein the retention assembly is configured to transition from the disengaged to the engaged position in response to relative movement of the first portion toward the second portion in a first direction, and the retention assembly is configured to transition from the engaged to the disengaged position in response to movement of the first portion relative to the second portion in a second direction that is transverse to the first direction.

6. The battery pack retention system of claim 1, further comprising a serrated tab of the retention assembly and a serrated clip of the retention assembly, the serrated tab received within the serrated clip when the retention assembly is in the engaged position.

7. The battery pack retention system of claim 1, further comprising a slotted bracket of the retention assembly and a tanged clip of the retention assembly, the slotted bracket configured to compress at least one tang of the tanged clip to permit insertion of the tanged clip into a slot of the slotted bracket as the retention assembly is transitioned from the disengaged to the engaged position.

8. The battery pack retention system of claim 1, further comprising a clip of the retention assembly and a lip of the retention assembly, the clip configured to receive the lip as the retention assembly is transitioned from the disengaged to the engaged position.

9. The battery pack retention system of claim 1, further comprising a hooked extension of the retention assembly and a tabbed bracket of the retention assembly, the tabbed bracket including at least one tab biased toward a flange, the hooked extension configured to bend the at least one tab to permit movement of a portion of the hooked extension between the at least one tab and the flange as the retention assembly is transitioned from a disengaged to an engaged position.

10. The battery pack retention system of claim 9, wherein the at least one tab contacts the extension to blocks movement of the retention assembly from the engaged to a disengaged position.

11. A battery pack retention system, comprising:
a retention assembly that transitions from a disengaged to an engaged position in response to movement of a portion of a battery pack enclosure relative to a battery array housed within the battery pack enclosure, a first portion of the retention assembly disposed on a lid of the battery pack enclosure and a second portion of the retention assembly disposed on a tray of the battery pack.

12. The battery pack retention system of claim 11, wherein the first and second portions extend between the battery array and an adjacent battery array within the battery pack enclosure.

13. A securing method, comprising:
moving a portion of a battery pack enclosure relative to a battery array that is housed within the battery pack enclosure to transition a retention assembly from a disengaged to an engaged position, wherein a first portion of the retention assembly is disposed on the battery pack enclosure and a second portion of the retention assembly is disposed on the battery array.

14. The securing method of claim 13, further comprising powering an electrified vehicle using the battery array.

15. The securing method of claim 13, wherein the retention assembly in the engaged position is disposed entirely within an interior of the battery pack enclosure and spaced a distance from each laterally facing side of the battery pack enclosure.

16. The securing method of claim 13, further comprising transitioning the retention assembly from the disengaged to the engaged position by moving the first portion relatively toward the second portion in a first direction, and transitioning the retention assembly from the engaged to the disengaged position by moving the first portion relative to the second portion in a second direction that is transverse to the first direction.

17. The securing method of claim 16, wherein the first direction extends vertically, and the second direction extends horizontally.

18. The securing method of claim 13, further comprising securing a lid of the battery pack enclosure to a tray of the battery pack enclosure using the retention assembly in the engaged position.

\* \* \* \* \*